(12) United States Patent
Kula et al.

(10) Patent No.: US 6,828,904 B2
(45) Date of Patent: Dec. 7, 2004

(54) IMPACT SENSOR POST COLLISION NOTIFICATION SYSTEM

(75) Inventors: Paul Kevin Kula, Farmington Hills, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 09/683,604

(22) Filed: Jan. 24, 2002

(65) Prior Publication Data

US 2003/0137410 A1 Jul. 24, 2003

(51) Int. Cl.[7] ................................................ B60Q 1/00
(52) U.S. Cl. ...................... 340/436; 340/438; 340/458; 340/903; 340/467; 340/472
(58) Field of Search ................. 340/436, 438, 340/439, 458, 903, 435, 437, 454, 467, 468, 469, 472

(56) References Cited

U.S. PATENT DOCUMENTS

| | | | | |
|---|---|---|---|---|
| 4,992,943 A | * | 2/1991 | McCracken | 340/436 |
| 5,369,591 A | * | 11/1994 | Broxmeyer | 340/436 |
| 6,168,197 B1 | * | 1/2001 | Paganini et al. | 340/436 |
| 6,204,756 B1 | * | 3/2001 | Senyk et al. | 340/438 |
| 6,273,460 B1 | * | 8/2001 | Cox | 340/438 |
| 6,311,112 B1 | * | 10/2001 | Mazur et al. | 701/45 |
| 6,439,602 B2 | * | 8/2002 | Cox et al. | 701/45 |

* cited by examiner

*Primary Examiner*—Daniel J. Wu
*Assistant Examiner*—Daniel Previl
(74) *Attorney, Agent, or Firm*—Frank A. MacKenzie

(57) ABSTRACT

An impact sensor is provided including a counter electrically coupled to the sensor and storing an impact sensor collision number. The impact collision number represents whether the impact sensor has been on a vehicle that has been involved in a collision. A method for indicating that the impact sensor has been on a vehicle that has been involved in a collision is also provided. The method includes sensing a collision and generating a collision signal in response to the collision. An impact sensor collision number is incremented and indicated in response to the collision signal.

21 Claims, 1 Drawing Sheet

IMPACT SENSOR POST COLLISION NOTIFICATION SYSTEM

BACKGROUND OF INVENTION

The present invention is related to U.S. patent application Ser. No 09/683,605 entitled "Post Collision Restraints Control Module" filed simultaneously herewith and incorporated by reference herein.

The present invention relates generally to automotive vehicle impact sensors, and more particularly to a method and apparatus for indicating that a vehicle impact sensor has been on a vehicle that has been involved in a collision.

Impact sensors are commonly used on vehicles for sensing an impact between an object and a vehicle of concern. Impact sensors relay a signal to a restraint system, which than activates a restraint device such as an air bag or a pretensioner to decrease the potential of an operator injury during the collision.

Currently, many vehicles have a restraints control module (RCM), which controls of the restraint systems in a vehicle. The RCM receives collision signals from the impact sensors and determines whether to activate a restraint. The RCM also keeps track of the number of times the vehicle has been in a collision.

A disadvantage with existing RCM systems is that they do not have knowledge as to whether an impact sensor has been in a collision. For example, an impact sensor may be removed from one vehicle and placed into a second vehicle. A RCM in the second vehicle has no way of knowing whether the replacement impact sensor was on a vehicle that has been in a collision. Although the RCM has knowledge of the number of times it has been on a vehicle that has been in an accident, this knowledge conveys nothing about the replacement impact sensor.

An impact sensor that has been on a vehicle that has been involved in a collision could have sustained undetectable damage. Although, the impact sensor may be capable of surviving a collision multiple times, the undetectable damage may cause the impact sensor to not operate as originally designed.

It would therefore be desirable to develop an improved post collision notification system that has knowledge as to whether an impact sensor has been on a vehicle that has been in a collision. This knowledge would allow an owner of a vehicle to have the impact sensor tested by a trained technician and replaced when necessary.

SUMMARY OF INVENTION

The foregoing and advantages thereof are provided by a method and apparatus for indicating that a vehicle impact sensor has been on a vehicle that has been involved in a collision. An impact sensor is provided including a counter electrically coupled to the impact sensor and storing an impact sensor collision number. The impact collision number represents whether the impact sensor has been on a vehicle that has been involved in a collision.

A method for indicating whether the impact sensor has been on a vehicle that has been involved in a collision is also provided. The method includes sensing a collision and generating a collision signal in response to the collision. An impact sensor collision number is incremented and indicated in response to the collision signal.

One of several advantages of the present invention is that in providing a method of determining whether an impact sensor has been on a vehicle that has been involved in a collision it also provides an improved technique to determine whether the impact sensor should be serviced for potential malfunctions, as to assure proper functioning.

Another advantage of the present invention is that it indicates to an operator or a controller the number of involved collisions even after the impact sensor has been translocated from one vehicle to another vehicle.

Furthermore the present invention in indicating the number of involved collisions allows a service center to determine whether the impact sensor should be replaced or not, depending on manufacturer specifications.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below byway of examples of the invention wherein.

DETAILED DESCRIPTION

While the present invention is described with respect to an apparatus and method for indicating that an impact sensor has been on a vehicle that has been in a collision the following apparatus and method is capable of being adapted for various purposes and is not limited to the following applications: automotive vehicles, restraint impact sensors, or other sensor applications.

In the following description, various operating parameters and components are described for one constructed embodiment. These specific parameters and components are included as examples and are not meant to be limiting.

Figure 1:
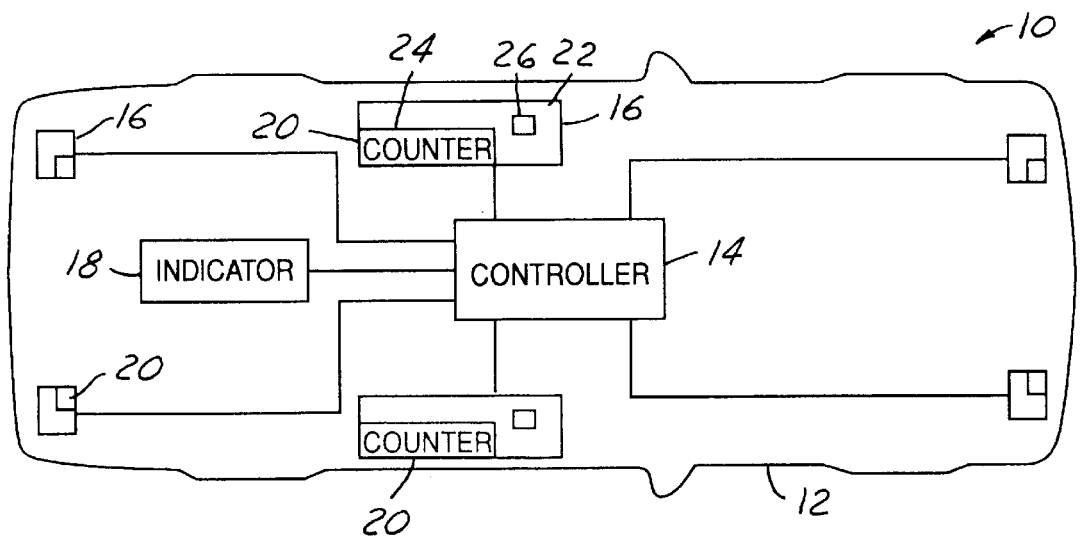
FIG. 1 is a schematic block diagram of an impact sensor post collision notification system in accordance with an embodiment of the present invention.

Referring now to FIG. 1, a schematic block diagram of an impact sensor post collision notification system 10 in accordance with an embodiment of the present invention is shown. The system 10 is shown within an automotive vehicle 12. The system 10 includes a controller 14, impact sensors 16, and a first indicator 18.

Controller 14 may be a microprocessor based controller such as a computer having a central processing unit, memory (RAM and/or ROM), and associated inputs and outputs operating in cooperation with a communications bus. Controller 14 may be a portion of a main control unit, such as a restraints control module or a main vehicle controller, or be a stand-alone controller. The controller 14 may store deployment information as to when electrical current is supplied to any deployable device within the automotive vehicle 12. A deployable device includes an air bag, a pretensioner, or other safety restraint device. The controller 14 upon determining whether a deployable event has occurred may determine whether to increment an impact sensor collision number. For example, when a collision occurs and a deployable device is not supplied current, the controller 14 may have determined that the severity of the impact and the location of the impact does not warrant incrementing the impact sensor collision number. On the other hand, the controller 14 may determine that the severity of the impact warrants incrementing the impact sensor collision number on each impact sensor on the vehicle 12.

Impact sensors 16 may be of various type and style including front, side, rear, and oblique impact sensors or other impact sensors known in the art. Although the impact sensors 16 are illustrated as having counters 20 for storing an impact sensor collision number corresponding to the number of times a particular impact sensor has been on a vehicle that has been involved in a collision the counters 20 may be of other form or style as to indicate the same. An impact sensor 22, of the impact sensors 16 may increment a corresponding impact sensor collision number mechanically or electrically during an impact. A corresponding counter 24 may indicate the impact sensor collision number in similar fashion or form to that of the first indicator 18 as described below. An impact sensor collision number of a first impact sensor may also be incremented by controller 14 in response to a collision signal received from a second impact sensor.

The first indicator 18 may indicate various information including: the impact sensor collision number, a fault when the impact sensor collision number is greater than a predetermined value, whether the impact sensor has been serviced, a fault when the impact sensor is malfunctioning, the location of the impact sensor, status of the impact sensor, or various other impact sensor related information. The first indicator 18 may be a pulsating indicator, a light bulb, an LED, a fluorescent light, an audible signal, a visual signal, a 7-segment display, an analog gage, a digital meter, a video display, a hazard light, or various other indicators known in the art.

The impact sensor 22 may have a second indicator 26 as to indicate whether the impact sensor has been serviced since its last involvement in a collision. The second indicator 26 may be resettable only by a trained technician with special sensor specific equipment or entry codes. The special sensor specific equipment or reset codes prevent falsely indicating that an impact sensor is in proper operating condition. Second indicator 26 may be of same form and style as that of the first indicator 18.

The first indicator 18, counters 20, and second indicator 26 do not prevent impact sensors 16 from functioning. As opposed to the controller 14 that may or may not prevent an impact sensor from functioning. Controller 14 may have logic as to determine whether the impact sensors 16 are functioning properly and then whether to allow the sensors to continue to function or not.

Figure 2:
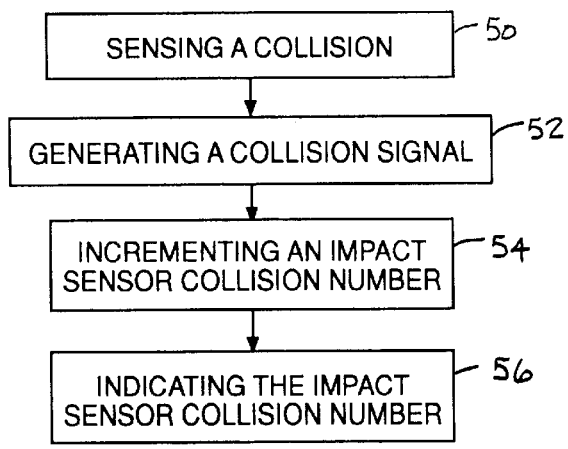
FIG. 2 is a logic flow diagram illustrating a method of indicating that an impact sensor has been on a vehicle that has been in a collision in accordance with an embodiment of the present invention.

Referring now to FIG. 2, a flow chart illustrating a method of indicating that an impact sensor has been on a vehicle that has been in a collision in accordance with an embodiment of the present invention is shown.

In step 50, during a collision involving the vehicle 12 an impact sensor senses the collision.

In step 52, the impact sensor generates a collision signal in response to the sensed collision. The collision signal is then transferred to the controller 14.

In step 54, a corresponding impact sensor collision number is incremented, thereby, reflecting that the impact sensor has been on a vehicle that has been involved in a collision. The impact sensor collision signal may be directly incremented within the impact sensor in response to the collision signal or may be incremented by the controller 14. The impact sensor collision number is also stored within the memory of controller 14. The controller 14 generates a notification signal in response to the collision signal and transfers the notification signal to the first indicator 18.

In step 56, the impact sensor collision number is indicated. The impact sensor collision number may be indicated in various forms. The impact sensor collision number may be indicated via the first indicator 18, the counter 24, or the second indicator 26. The impact sensor collision number may also be internal to the impact sensor and only readable through use of a sensor servicing computer.

The present invention provides a method and device for assuring that an impact sensor that has been on a vehicle that has been involved in a collision has an attached, incrementable, nondecrementable, and irresettable counter as to prevent unknowing use of the impact sensor under an assumption that it is a virgin sensor. The present invention also indicates whether the impact sensor was involved in a collision and has not been serviced.

The present invention is so doing, further provides increased vehicle safety by promoting the use of properly functioning impact sensors. The present invention therefore, also informs an operator that an impact sensor may need servicing and potentially that the operated vehicle, assuming it has all original factory impact sensors, has been involved in a collision. The operator may upon gathering this information choose to have the vehicle and/or impact sensors serviced or replaced and use the information with discretion when purchasing the vehicle.

The above-described method, to one skilled in the art, is capable of being adapted for various purposes and is not limited to the following applications: automotive vehicles, restraint systems, impact sensors, or other sensor applications. The above-described invention may also be varied without deviating from the true scope of the invention.

What is claimed is:

1. An impact sensor comprising a counter electrically coupled to and contained within the impact sensor and storing an impact sensor collision number.

2. An impact sensor as in claim 1 further comprising a first indicator electrically coupled to said impact sensor and indicating when said impact sensor collision number is greater than a predetermined value.

3. A system as in claim 2 wherein said first indicator comprises at least one of: a pulsating indicator, a light bulb, an LED, a fluorescent light, an audible signal, a visual signal, a 7-segment display, an analog gage, a digital meter, a video system, and a hazard light.

4. A system as in claim 2 further comprising a second indicator for indicating whether the impact sensor has been serviced since the impact sensor's last activation.

5. A system as in claim 1 wherein said impact sensor collision number is incrementable and irresettable.

6. An impact sensor post collision notification system for a first impact sensor comprising:
   a counter electrically coupled to the first impact sensor, said counter storing a first impact sensor collision number that is irresettable;
   an first indicator; and
   a controller electrically coupled to said counter and said first indicator, said controller generating a notification signal and transferring said notification signal to said first indicator when said first impact sensor collision number is greater than a predetermined value.

7. A system as in claim 6 further comprising:
   a second impact sensor electrically coupled to said controller and generating a second collision signal, wherein said controller increments said first impact sensor collision number in response to said second collision signal.

8. A system as in claim 6 wherein said first impact sensor comprises said counter.

9. A system as in claim 6 wherein said controller comprises said counter.

10. A system as in claim 6 wherein said first impact sensor collision number is nondecrementable.

11. A system as in claim 6 wherein said first impact sensor collision number is attached to said first impact sensor, and is incrementable and nondecrementable.

12. A system as in claim 6 wherein said first indicator indicates when said first impact sensor collision number is less than or equal to said predetermined value.

13. A system as in claim 6 further comprising a second indicator for indicating whether the impact sensor has been serviced since the impact sensor's last activation in a collision.

14. A system as in claim 13 wherein said second indicator is resettable using special specific impact sensor equipment or reset codes.

15. A system as in claim 6 wherein said controller signals a fault indicator when said first impact sensor collision number is greater than said predetermined value.

16. A system as in claim 6 wherein said controller increments an impact sensor counter in response to a collision signal.

17. A method for indicating that an impact sensor has been on a vehicle that has been in a collision, said method comprising:

sensing a collision;

generating a collision signal in response to said collision;

incrementing an impact sensor collision number in response to said collision signal comprising incrementing an impact sensor internal counter; and indicating said impact sensor collision number.

18. A method as in claim 17 wherein sensing a collision comprises sensing at least one of: a side impact, a front impact, a rear impact, an oblique impact, and a rollover.

19. A method as in claim 17 further comprising storing of said impact sensor collision number.

20. A method as in claim 17 wherein incrementing an impact sensor internal counter comprises incrementing an irresettable impact sensor internal counter.

21. A method as in claim 17 wherein incrementing an impact sensor collision number comprises incrementing a stored value within a controller.

* * * * *